US010273170B2

(12) United States Patent
Lienhard et al.

(10) Patent No.: US 10,273,170 B2
(45) Date of Patent: Apr. 30, 2019

(54) METHOD AND APPARATUS FOR PARTIALLY DESALINATING PRODUCED WATER TO FORM EXTRACTION FLUID USED FOR FOSSIL FUEL EXTRACTION

(71) Applicants: Massachusetts Institute of Technology, Cambridge, MA (US); King Fahd University of Petroleum and Minerals, Dhahran (SA)

(72) Inventors: John H. Lienhard, Lexington, MA (US); Ronan Killian McGovern, Cambridge, MA (US); Lige Sun, Bochum (DE); Adam Michael Weiner, Somerville, MA (US); Syed M. Zubair, Dhahran (SA)

(73) Assignees: Massachusetts Institute of Technology, Cambridge, MA (US); King Fahd University of Petroleum and Minerals, Dhahran (SA)

( * ) Notice: Subject to any disclaimer, the term of this patent is extended or adjusted under 35 U.S.C. 154(b) by 116 days.

(21) Appl. No.: 15/305,485

(22) PCT Filed: Apr. 23, 2015

(86) PCT No.: PCT/US2015/027258
§ 371 (c)(1),
(2) Date: Oct. 20, 2016

(87) PCT Pub. No.: WO2015/164583
PCT Pub. Date: Oct. 29, 2015

(65) Prior Publication Data
US 2017/0044033 A1 Feb. 16, 2017

Related U.S. Application Data

(60) Provisional application No. 61/982,973, filed on Apr. 23, 2014.

(51) Int. Cl.
*C02F 1/469* (2006.01)
*C02F 9/06* (2006.01)
(Continued)

(52) U.S. Cl.
CPC .............. *C02F 1/4693* (2013.01); *C02F 9/00* (2013.01); *C02F 2103/10* (2013.01);
(Continued)

(58) Field of Classification Search
CPC .. C02F 1/4693; C02F 1/4695; C02F 2301/08; C02F 9/00; B01D 61/42; B01D 61/422; B01D 61/44; B01D 61/445; B01D 61/46
See application file for complete search history.

(56) References Cited

U.S. PATENT DOCUMENTS 3,838,774 A    10/1974   Dolan et al. .................... 210/85
5,223,107 A    6/1993    Batchelder ................. 204/182.6
(Continued)

FOREIGN PATENT DOCUMENTS

CA          2186860 C        11/1995    .............. C02F 1/469
WO    WO 2014/056048 A1    4/2014    .............. C02F 1/469

OTHER PUBLICATIONS

Ahmadun et al., "Review of technologies for oil and gas produced water treatment," Journal of Hazardous Materials, vol. 170, pp. 530-551, May 19, 2009.
(Continued)

*Primary Examiner* — Steven A. Friday
(74) *Attorney, Agent, or Firm* — Sunstein Kann Murphy & Timbers LLP

(57) ABSTRACT

A method reuses produced water resulting from a fossil fuel extraction operation. The method includes providing the produced water as an input to an electrodialysis system. The method also includes running the electrodialysis system to produce a diluate and a concentrate. The diluate is contami-
(Continued)

nated so as to have a conductivity of no less than 0.1 Siemens/meter. The method also includes reformulating the diluate to produce fossil fuel extraction fluid. The method also includes using the produced fossil fuel extraction fluid in the fossil fuel extraction operation. An electrodialysis system includes first and second stacks. The electrodialysis system also includes first and second voltage sources, coupled to the first and second stacks, so as to apply a first voltage to the first stack lower by at least about 10% than a second voltage to the second stack.

6 Claims, 5 Drawing Sheets

(51) Int. Cl.
   *C02F 9/00* (2006.01)
   *C02F 103/10* (2006.01)
(52) U.S. Cl.
   CPC .............. *C02F 2201/4614* (2013.01); *C02F 2201/46135* (2013.01); *C02F 2209/05* (2013.01); *C02F 2209/09* (2013.01); *C02F 2301/08* (2013.01); *Y02A 20/134* (2018.01)

(56) References Cited

U.S. PATENT DOCUMENTS

| | | | |
|---|---|---|---|
| 8,142,633 B2 | 3/2012 | Batchelder et al. | 204/524 |
| 2005/0183955 A1* | 8/2005 | Crowley | A23L 2/74 204/450 |
| 2010/0282689 A1* | 11/2010 | Ganzi | B01D 61/58 210/748.2 |
| 2011/0089036 A1* | 4/2011 | Sparrow | C02F 1/4693 204/522 |
| 2012/0118729 A1* | 5/2012 | Liang | B01D 61/48 204/267 |
| 2013/0031972 A1 | 2/2013 | Freese et al. | 73/152.18 |
| 2013/0248175 A1 | 9/2013 | Frisk et al. | 166/267 |

OTHER PUBLICATIONS

Choi et al., "An electrodialysis model for determination of the optimal current density," Desalination, vol. 153, pp. 399-404, Apr. 29, 2002.
Sirivedhin et al., "Reclaiming produced water for beneficial use: salt removal by electrodialysis," Journal of Membrane Science, vol. 243, pp. 335-343, Aug. 25, 2004.
International Searching Authority, International Search Report and Written Opinion for PCT/US15/27258, dated Jul. 15, 2015, 18 pages.

\* cited by examiner

METHOD AND APPARATUS FOR PARTIALLY DESALINATING PRODUCED WATER TO FORM EXTRACTION FLUID USED FOR FOSSIL FUEL EXTRACTION

CROSS-REFERENCE TO RELATED APPLICATIONS

The present application claims priority to U.S. Provisional Application No. 61/982,973, entitled "System for the Desalination of High Salinity Waters" and filed Apr. 23, 2014, which is hereby incorporated by reference herein in its entirety.

TECHNICAL FIELD

The present disclosure relates to reusing produced water collected from fossil fuel extraction operations, and more particularly, to running electrodialysis systems at low voltages to partially desalinate the produced water. The resulting diluate from the electrodialysis systems can be used in forming fossil fuel extraction fluid.

BACKGROUND ART

Fossil fuel extraction systems produce extraction fluid by combining at least fresh water with viscosity modifiers. An extraction system injects this fluid into a well. Subsequent to injection, a fluid containing at least fresh water returns to the surface as produced water. The system collects the produced water, recycles the water via distillation, and combines the distilled water with fresh water and viscosity modifiers to form more extraction fluid. Distillation yields water of high purity, but also adds substantial costs to the extraction system.

SUMMARY OF THE EMBODIMENTS

In accordance with one embodiment of the present disclosure, a method reuses produced water resulting from a fossil fuel extraction operation. The method includes providing the produced water as an input to an electrodialysis system. The method also includes running the electrodialysis system to produce a diluate and a concentrate. The diluate is contaminated so as to have a conductivity of no less than 0.1 Siemens/meter. The method also includes reformulating the diluate to produce fossil fuel extraction fluid. The method also includes using the produced fossil fuel extraction fluid in the fossil fuel extraction operation.

In various embodiments, reformulating includes adding a viscosity modifier. The viscosity modifier may be selected from a group consisting of a drag reducing agent, a polymer cross-linking agent, a polymer and any combination thereof. Reformulating may include adding an aqueous liquid. In some embodiments, the electrodialysis system is configured to operate with a minimum current density of at least about 50 amps/m$^2$ in each stack. In some embodiments, the diluate is contaminated so as to have a conductivity of no less than 0.3 Siemens/meter, 1.0 Siemens/meter, 3.0 Siemens/meter or 10.0 Siemens/meter.

In accordance with another embodiment of the present disclosure, a method operates an electrodialysis system. The electrodialysis system has at least one stack of at least one pair of electrodes. At least one cell pair having an anion exchange membrane and a cation exchange membrane is disposed between the at least one part of electrodes. The system is configured to utilize a voltage, applied to the at least one pair of electrodes, of V per cell pair disposed between the at least one pair of electrodes. The system is configured for conventional operation with a liquid feed having a conductivity below 0.3 Siemens/m.

The method includes providing the liquid feed having a conductivity above 0.3 Siemens/m, and applying the voltage, of less than about 0.2V per cell pair, to the at least one pair of electrodes. In various embodiments, the liquid feed has a conductivity above about 1.0 Siemens/m, above about 3.0 Siemens/m, or above about 10.0 Siemens/m. The voltage may be less than about 0.15 V or about 0.10 V per cell pair.

In accordance with another embodiment of the present disclosure, an electrodialysis system includes first and second stacks. Each stack has at least one pair of electrodes, between which is disposed at least one cell pair having an anion exchange membrane and a cation exchange membrane. Each of the first and second stacks has a diluate input, a diluate output and a concentrate output. The diluate output of the first stack is fluidly coupled to the diluate input of the second stack.

First and second voltage sources are coupled to the at least one pair of electrodes of the first and second stacks respectively so as to apply a first voltage to the first stack and a second voltage to the second stack. The first voltage is lower than the second voltage by at least about 10%. In various embodiments, first voltage is lower than the second voltage by at least about 20% or at least about 50%. In some embodiments, the first voltage is about 0.1 V per cell pair.

The first stack may have a first electrical resistance and the second stack may have a second electrical resistance. The ratio of the first voltage to the second voltage is approximately equal to a square root of a ratio of the first electrical resistance to the second electrical resistance.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Definitions. As used in this description and the accompanying claims, the following terms shall have the meanings indicated, unless the context otherwise requires:

"Produced water" means a fluid that returns to the surface after a fossil fuel extraction operation. Produced water may include flowback water.

"Fossil fuel extraction fluid" means a fluid selected from the group consisting of hydraulic fracturing fluid, fluid used in advanced oil recovery, and a combination thereof.

A "fossil fuel extraction operation" means an operation selected from the group consisting of hydraulic fracturing, advanced oil recovery, and a combination thereof.

A liquid is "contaminated" when it contains ionic dissolved solids.

A "voltage source" is an arrangement for supplying a voltage to a load. First and second voltage sources need not be developed from two independent circuits, as long as each voltage source provides the voltage level ascribed to it.

Figure 1:
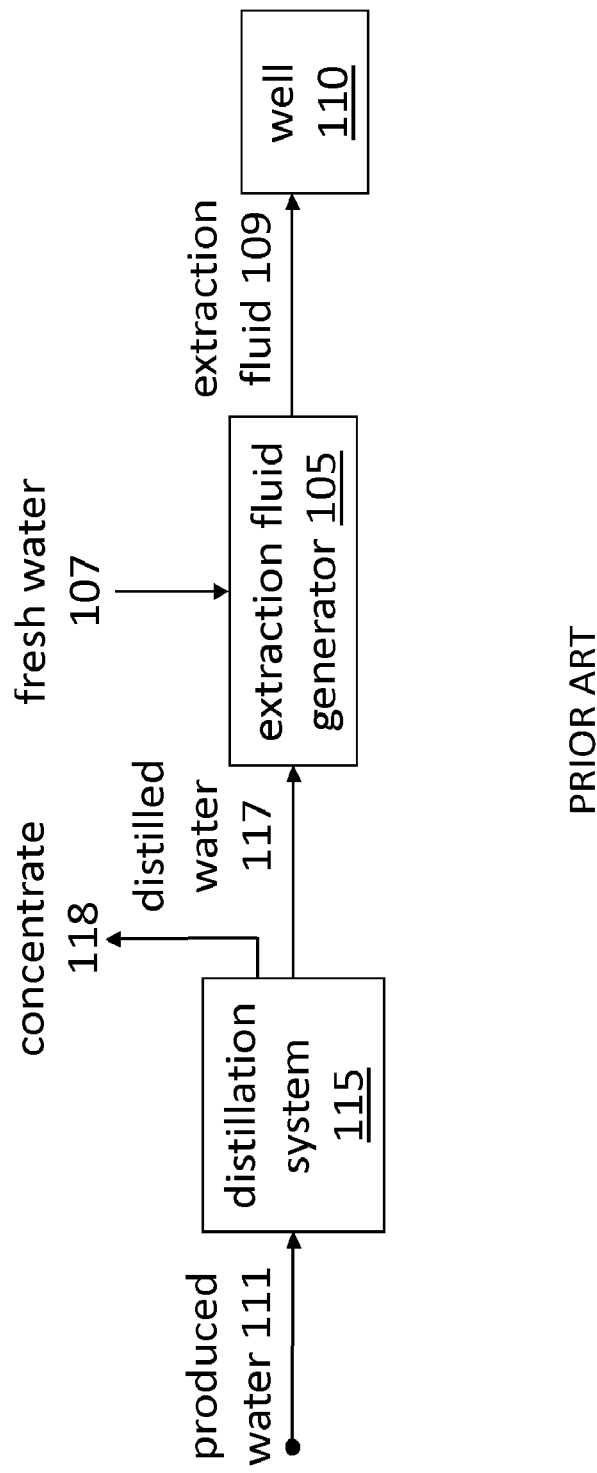
FIG. 1 depicts a schematic diagram of an exemplary conventional system that reuses produced water in a fossil fuel extraction operation.

Water use and management incur significant costs for conventional fossil fuel extraction operations. FIG. 1 depicts a conventional system 100 for extracting fossil fuels, in which the extraction fluid generator 105 adds viscosity modifiers, such as drag reducing agents, cross-linking agents, and/or polymers, to at least fresh water 107 to create an extraction fluid 109. The system 100 injects the extraction fluid 109 into a well 110. By fracturing the underlying rock formations, the extraction fluid 109 loosens beds of fossil fuels and thereby enables the fuels to be more readily harvested. Alternatively, or in combination, in advanced oil recovery, the extraction fluid 109 may serve to scour oil from sub-surface formations. Water from the extraction fluid 109 returns to the surface as produced water 111, which the extraction system 100 collects and sends to its distillation system 115. The distillation system 115 distills the produced water 111, and the extraction fluid generator 105 combines the distilled water 117 with fresh water 107 and further viscosity modifiers to create more extraction fluid 109 for subsequent operations.

As water from the extraction fluid 109 returns to the surface, the water 111 becomes contaminated by dissolving various solids from the ground. As a result, the produced water 111 is saline (e.g., between about 0.1 Siemens/m to about 5.0 Siemens/m) and sometimes highly saline (e.g., over about 5.0 Siemens/m). Because common viscosity modifiers are known to become less effective when used with higher saline fluids, completely desalinated water can be relied on for producing effective extraction fluid in a consistent manner. For these reasons, distillation has become the preferred treatment for recycling produced water in conventional fossil fuel extraction systems. Since distillation is also an expensive procedure, the distillation system 115 contributes substantially to the cost of fossil fuel extraction. For example, water use and management may account for 10-15% of the total cost of operations.

Due to a number of surprising discoveries, embodiments of the present invention provide energy efficient and cost effective measures to improve upon conventional fossil fuel extraction systems. For example, embodiments create effective extraction fluids 109 using fluids with higher salinity than previously used, which were also obtained using unconventional methods. Compared to using distillation to completely purify water, employing electrodialysis to partially desalinate produced water generates significant savings. These savings can outweigh the drawbacks of formulating an extraction fluid using a fluid of higher electrical conductivity. Moreover, when viscosity modifiers exceed the threshold level of conductivity of the fluid with which they will be mixed, using electrodialysis to reduce the conductivity of the produced water down to the threshold level can be more cost effective than distilling the produced water or blending the produced water with a large amount of fresh water. This finding renders distilled water unnecessarily pure for use in fossil fuel extraction systems, and embodiments use other, less expensive, desalination treatments to substitute for distillation.

In particular, embodiments use electrodialysis to partially desalinate produced water to a salinity that is still viable for use in fossil fuel extraction operations. For a number of reasons, electrodialysis had not been an apparent candidate for treating highly saline fluids. First, electrodialysis was conventionally used to desalinate fluids at much lower salinity levels than sea water, so its potential advantages for treating produced water was unknown, untested, and unappreciated. Second, electrodialysis systems normally operate at high voltages. Extrapolating this assumption to high salinity gives the illusion of higher energy costs than those that are actually incurred.

Figure 2:
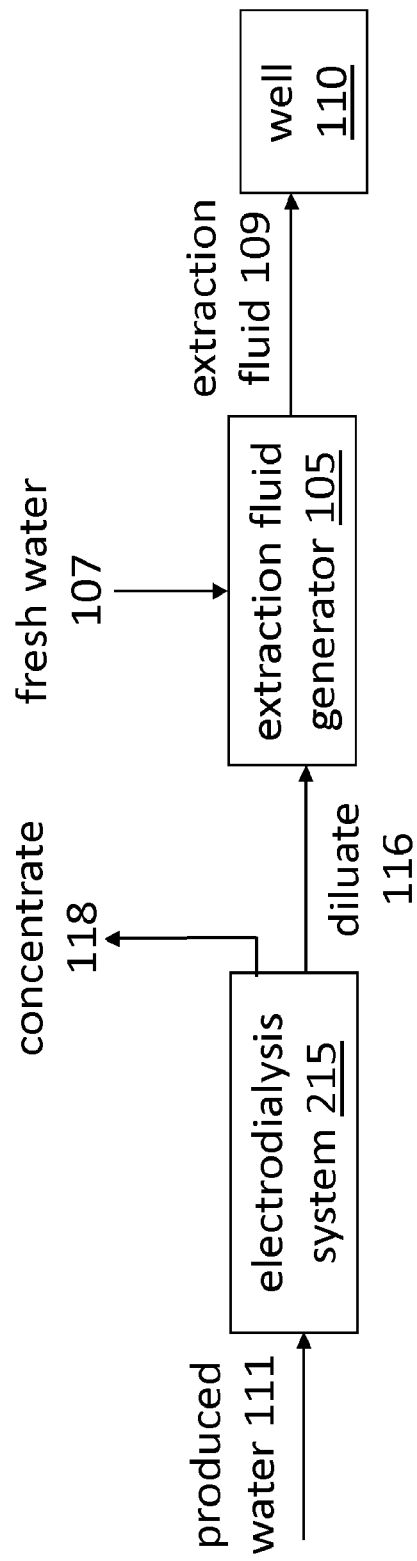
FIG. 2 depicts a schematic diagram of an exemplary system that reuses produced water in a fossil fuel extraction operation according to one embodiment of the present disclosure.

Embodiments provide electrodialysis systems, and methods of operating the same, that enable fossil fuel extraction operations to replace the distillation systems 115 with electrodialysis systems 215, as depicted in FIG. 2. In these improved systems, the electrodialysis system 215 partially desalinates the produced water 111 to form a diluate 116, which the extraction fluid generator 105 combines with fresh water 107 and viscosity modifiers to form extraction fluid 109. The electrodialysis system 215 also creates a concentrate 118, which can be sent to a disposal well or used as a kill fluid to close a well once extraction operations have been completed.

Figure 3:
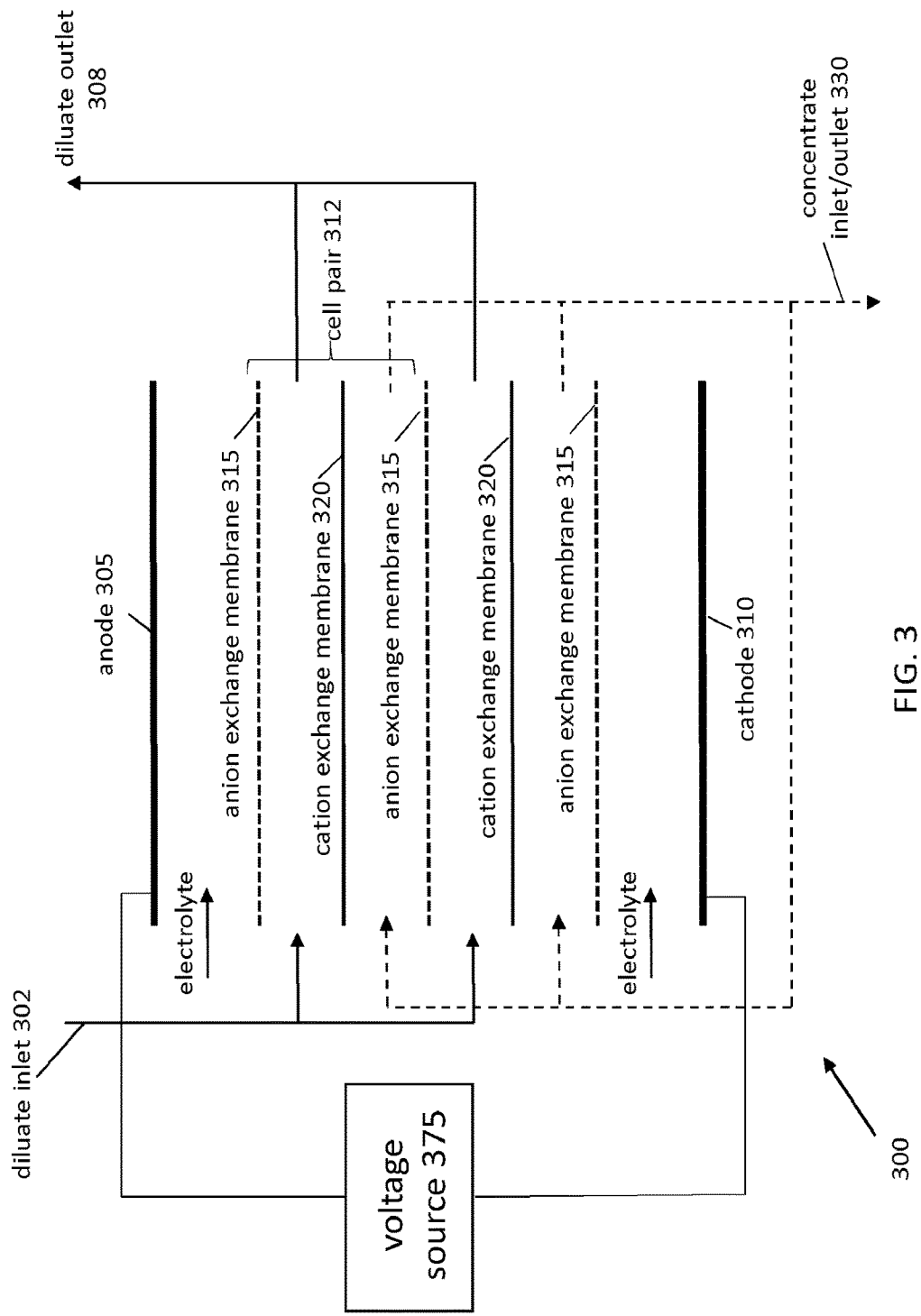
FIG. 3 depicts an exemplary schematic diagram of an electrodialysis stack.

To demonstrate how an electrodialysis system 215 functions, an exemplary electrodialysis stack 300 is depicted in FIG. 3. The stack 300 includes a pair of electrodes, namely, an anode 305 and a cathode 310. The stack 300 also includes at least one cell pair 312, and each cell pair 312 includes an anion exchange membrane 315, which only allows anions to pass through, and a cation exchange membrane 320, which only allows cations to pass through. In various embodiments, the ion exchange membranes may be any of the Neosepta CMX, CIMS, CMB, AMX, AHA, ACS, AFN, AFX or ACM membranes, manufactured by Astom Corporation, headquartered in Tokyo, Japan.

When the stack 300 includes multiple cell pairs 312, the cell pairs 312 are arranged so that the anion exchange membranes 315 alternate with the cation exchange membranes 320 in the layers of membranes. Each cell pair 312 corresponds to two channels through which fluid may flow. Although three exchange membranes 315, 320 are required to define the two channels, nevertheless, each cell pair 312 itself includes two exchange membranes 315, 320. Thus, for any given cell pair 312, an exchange membrane of an adjacent cell pair 312 provides the third membrane that bounds the second channel of the given cell pair 312.

In various embodiments, a stack 300 may include various channels, e.g., up to two thousand (2000) channels, defined by alternating anion 315 and cation 320 exchange membranes. In some embodiments, the exchange membranes 315, 320 are separated by a constant distance so that the channels have uniform height. However, the exchange membranes may alternatively be arranged to form channels of different heights.

The stack 300 includes an inlet 302 that receives the diluate 116, and the stack 300 divides the diluate 116 to flow through alternate channels of the cell pairs. The stack 300 receives concentrate 118 through an inlet/outlet 330, which the stack 300 divides to flow through the alternating channels that are not occupied by the diluate 116. In this manner, when diluate 116 flows through a channel, concentrate 118 flows through the channels immediately above and below the diluate 116, and vice versa. In some embodiments, the channels immediately adjacent to the anode 305 and cathode 310 contain neither diluate 116 nor concentrate 118.

To operate the electrodialysis stack 300, a voltage source 375 applies a voltage to the electrodes 305 and 310, and in response, ionic dissolved solids in the diluate 116 flow through the anion 315 and cation 320 exchange membranes into the concentrate 118. As a result, the stack 300 at least partially desalinates the diluate 116 while increasing the salinity of the concentrate 118.

Figure 4:
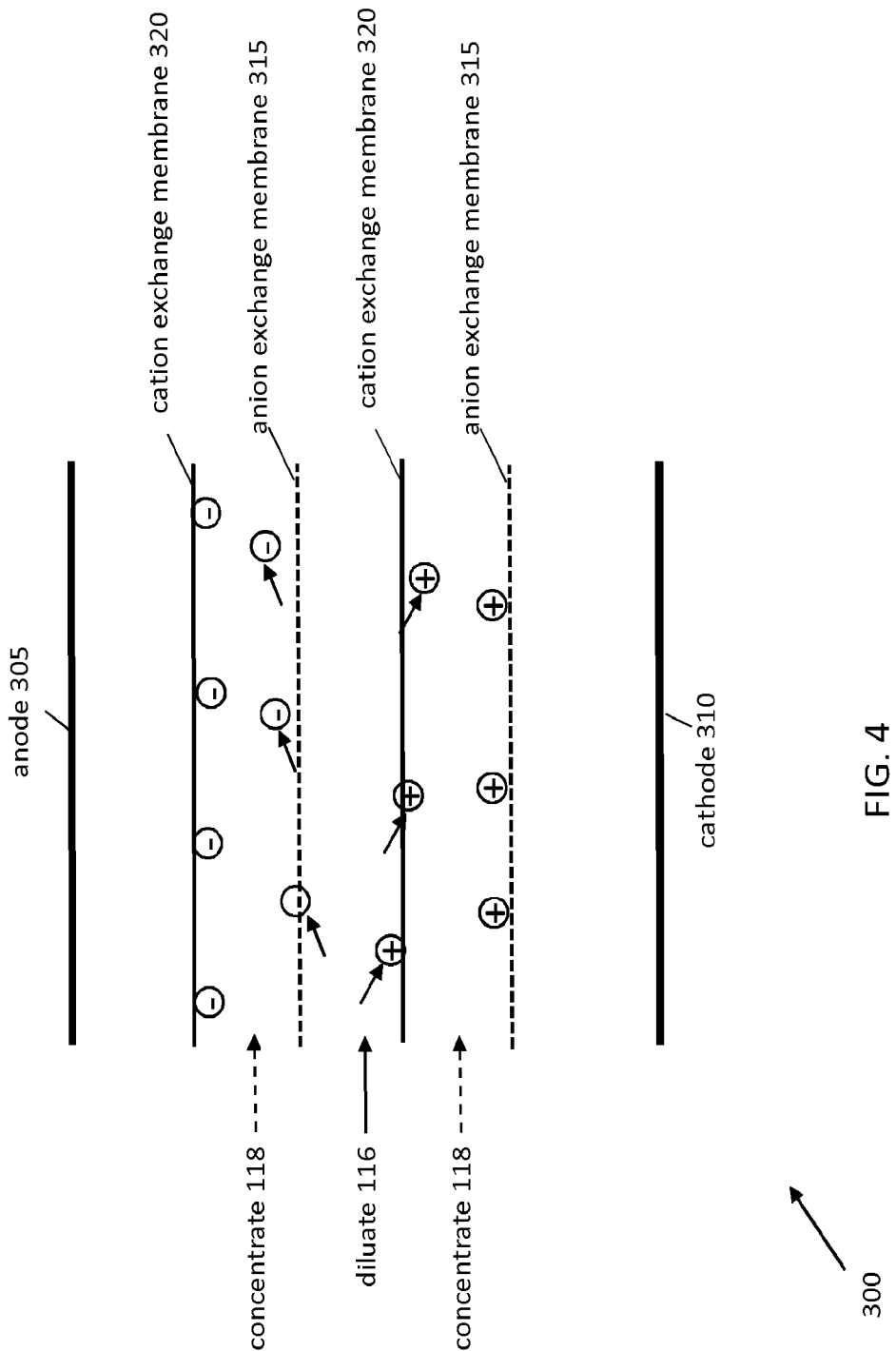
FIG. 4 depicts an exemplary schematic diagram of the operation of the electrodialysis stack of FIG. 3.

This process is depicted in more detail in FIG. 4. This figure depicts an enlarged view of three channels in the stack 300, and various features of the stack 300 have been removed for clarity. When voltage is applied to the electrodes 305 and 310, the anode 305 attracts the anions in the diluate 116 and concentrate 118. For each channel through which diluate 116 flows, the layer closer to the anode 305 is an anion exchange membrane 315. Since anion exchange membranes 315 allow anions to pass through, anions from the diluate 116 permeate the exchange membrane 315 to flow into the concentrate 118. However, for each channel through which concentrate 118 flows, the layer closer to the anode 305 is a cation exchange membrane 320. Although anions in the concentrate 118 are attracted to the anode 305, the cation exchange membrane 320 prohibits the anions from permeating the membrane 320. Thus, anions flow from diluate 116 to concentrate 118, and the cation exchange membranes 320 prohibit anions in the concentrate 118 from flowing into the diluate 116.

Similarly, for each channel through which diluate 116 flows, the layer closer to the cathode 310 is a cation exchange membrane 320, and for each channel through which concentrate 118 flows, the layer closer to the cathode 310 is an anion exchange membrane 315. The cathode 310 attracts the cations in the diluate 116 and concentrate 118, but the cation exchange membranes 320 allow cations to flow from the diluate 116 into the concentrate 118 while the anion exchange membranes 315 prohibit cations from leaving the concentrate 118.

Figure 5:
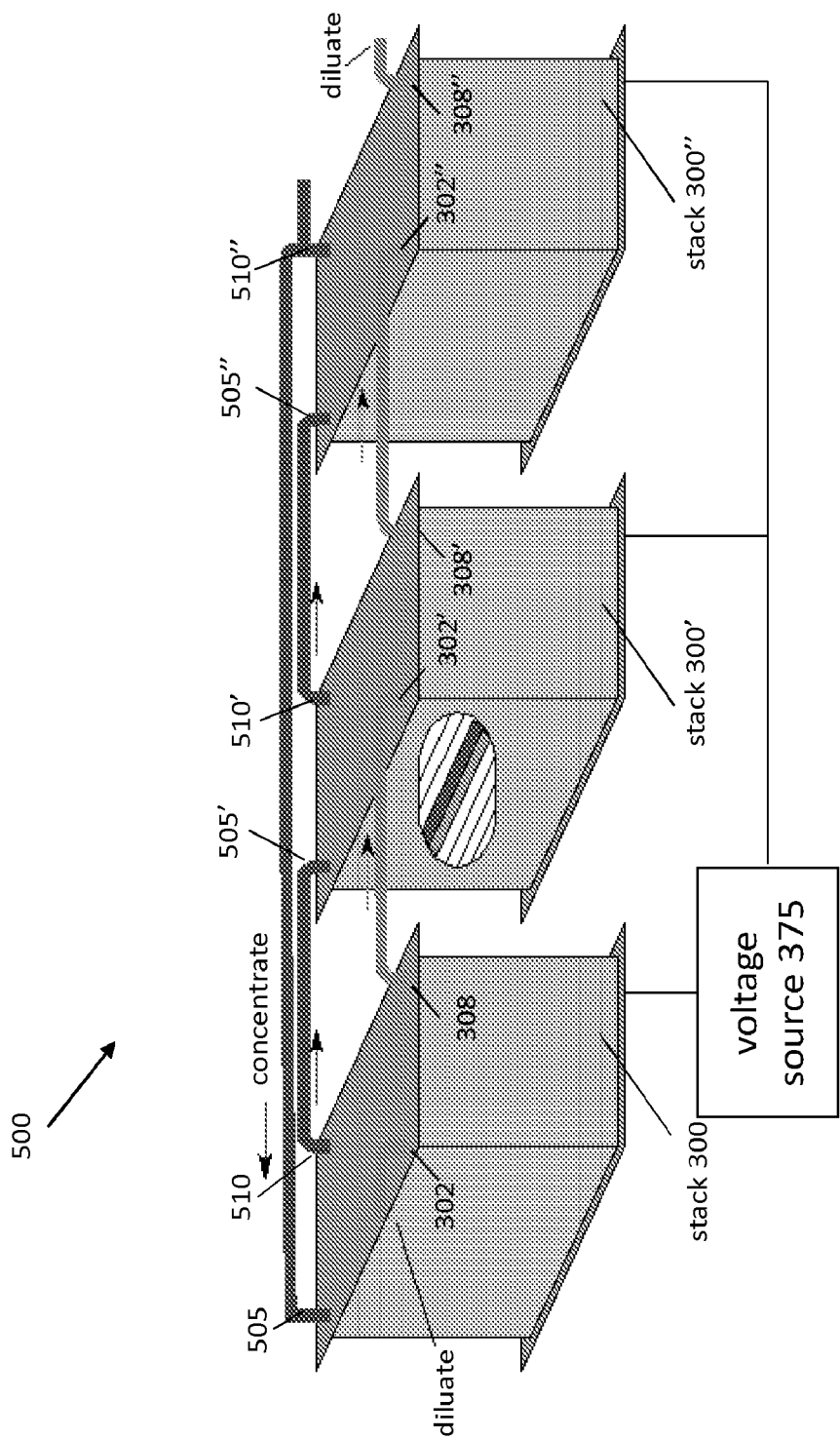
FIG. 5 depicts an exemplary multi-stack electrodialysis system used to partially desalinate produced water.

Multi-stack electrodialysis systems 500 connect stacks 300 in series, as depicted in FIG. 5. In this system 500, each stack 300 includes the elements described in reference to FIG. 3, namely, a pair of electrodes 305 and 310 and at least one cell pair 312 having an anion exchange membrane 315 and a cation exchange membrane 320. Although this embodiment of a multi-stack electrodialysis system 500 includes stacks 300 with equal numbers of cell pairs 312, in various embodiments, the stacks 300 may have different numbers of layers.

The multi-stack system 500 continuously flows concentrate 118 through alternate channels of the stacks 300, and the system 500 includes concentrate inlets 505 and concentrate outlets 510 that are fluidly coupled to re-circulate the concentrate 118 among the stacks 300. The first stack 300 receives the concentrate 118 through an inlet 505, divides the concentrate 118 to flow through alternate channels, aggregates the concentrate 118 into a single stream at the end of the layers, and sends the concentrate 118 stream through an outlet 510 that is fluidly coupled to the inlet 505' of the next stack 300'. The next stack 300' processes the concentrate 118 in a similar manner, and the last stack 300" sends the concentrate 118 through an outlet 510" that is fluidly coupled to the inlet 505 of the first stack 300.

As for the diluate 116, the first stack 300 receives diluate 116 through the inlet 302 and divides the diluate 116 to flow through the channels not occupied by the concentrate 118 (in some embodiments, the diluate inlet 302 is fluidly coupled to the concentrate inlet 505, thereby forming a bleed stream of fluid from the diluate to the concentrate). The voltage source 375 applies a voltage to the electrodes 305, 310 of the first stack 300, and the voltage pulls ionic dissolved solids in the diluate 116 across the anion and cation exchange membranes 315, 320 into the concentrate 118, thereby at least partially desalinating the diluate 116. At the end of each layer, the stack 300 aggregates the channels of diluate 116 into a single stream and flows the diluate 116 through an outlet 308. In the multi-stack system, each outlet 308 of a stack 300 is fluidly coupled to the inlet 302 of the subsequent stack 300. Thus, each subsequent stack 300 receives diluate 116 that has been further desalinated by the previous stack 300, and the voltage applied to the stack's electrodes 305, 310 pulls additional ionic dissolved solids in the diluate 116 across the exchange membranes 315, 320 into the concentrate 118. The final stack 300 in the system 500 flows the diluate 116 through an outlet 308" that is fluidly coupled to the extraction fluid generator 105 of the fossil fuel extraction operation system.

As previously discussed, conventional electrodialysis systems apply high voltages to their electrodes 315, 320 to desalinate diluates 116 with relatively low levels of salinity. For example, electrodialysis systems are conventionally operated at voltages between about 0.5 V and about 1.5 V per cell pair. Moreover, electrodialysis systems are conventionally used to desalinate fluids with conductivity below 0.3 Siemens/m and produce a diluate that is below about 0.1 Siemens/m.

Embodiments use electrodialysis systems to remediate highly saline fluids to the saline levels suitable for creating extraction fluid. Thus, although previously unconsidered for such purposes, electrodialysis systems can efficiently operate on fluids with conductivity above 0.3 Siemens/m, or current densities above about 50 amp/m$^2$. Preferably, electrodialysis systems can be used in a cost effective manner to desalinate fluids with conductivities above about 1.0 Siemens/m, about 3.0 Siemens/m, and about 10.0 Siemens/m, although fluids of other conductivities over 0.3 Siemens/m may be applied.

Further, although electrodialysis systems are often run at voltages in the range of about 0.5V-1.5V per cell pair, various embodiments of the present invention use lower voltages to remediate highly saline fluids, such as produced water 111, in an effective and cost efficient manner. Without wishing to be bound by theory, highly saline fluids exhibit greater conductivity due to their higher concentrations of ionic dissolved solids, and as a result, the fluids are more responsive to voltages applied to the stack electrodes 305, 310. Furthermore, for diluate salinities above roughly 0.3 Siemens/m, the effects of concentration polarization and the limiting current density become increasingly insignificant. In this manner, electrodialysis systems exhibit a lower cost per unit ionic solids removed, for highly saline fluids.

As a result, electrodialysis stacks 300 can remediate highly saline fluids using voltages that are less than about 0.2 V per cell pair. In various embodiments, the voltages may be preferably about 0.15 V per cell pair, about 0.10 V per cell pair, or about 0.05 V per cell pair, although any voltage less than 0.2 V per cell pair may be used. Thus, electrodialysis systems 500 can be used in fossil fuel extraction systems to remediate produced water 111 at lower cost than generally expected from such systems.

Furthermore, in multi-stack electrodialysis systems 500, conventionally, the same voltage is applied to each pair of electrodes in each stack 300. As discussed above, electrodialysis treats highly saline fluids more efficiently than lower saline fluids. However, because each stack 300 further decreases the salinity of the diluate 116, the subsequent stacks 300 become less cost efficient for processing the fluid.

Since electrodialysis is typically used to desalinate fluids to a high level of purity (less than 0.1 Siemens/m), the limiting current density typically constrains the current density that can be drawn. Because capital costs are typically high due to the low current densities that can be drawn when desalinating streams of high purity, controlling the ratio of the current density to the limiting current density can minimize these costs. For example, the ratio may be controlled to be close to unity, and in some embodiments, the ratio may be equal or greater than about 0.50. Applying approximately the same voltage across the electrodes in each stack 300 is a convenient way to achieve a constant ratio of current density to limiting current density in each stack 300. However, when conductivity is above about 0.1 Siemens/m, this practice may become ineffective.

Because the fossil fuel extraction operations can use fluids with higher than expected salinity levels to produce extraction fluid 109, applying different voltages to different stacks 300 of the electrodialysis system 500 can remediate the produced water 111 while controlling the final level of the diluate's 116 salinity, at reduced cost. Thus, the voltage source 375 can control voltages applied to the stacks to produce diluates 116 with salinities greater than or equal to 10.0, 3.0, 1.0, 0.3, or 0.1 Siemens/m. Although FIG. 5 depicts a single voltage source 375 applying voltages to the stacks 300, in alternate embodiments, the system 500 may include multiple voltage sources. For example, each stack 300 may be coupled to its own voltage source, or each voltage source may apply different voltages to each stack 300 in a subset of the stacks 300.

In one embodiment, the voltage source 375 applies a voltage of about 0.1 V per cell pair to the first stack 300 in a multi-stack electrodialysis system 500. In some embodiments, the voltage source 375 applies a voltage less than about 0.2 V per cell pair to at least one stack 300, but applies voltages greater than about 0.2 V per cell pair to all of the other stacks in the electrodialysis system 500. In some embodiments, the smallest voltage may be applied to the first stack 300 in the system 500. Alternatively, the voltage source 375 may apply voltages less than about 0.2 V per cell pair to all of the stacks, but the voltages among the stacks may vary. In some embodiments, the largest and smallest voltages applied to the stacks 300 may differ by more than about 1%. For example, the largest voltage may be about 5%, about 10%, about 20%, about 25%, or about 50% larger than the smallest voltage.

In electrodialysis systems 500, the voltages for the initial stacks 300 may be lower than the voltages for later stacks. In some embodiments, the voltage applied to the first stack 300 is at least about 20% lower than the voltage applied to the second stack 300'. In further embodiments, the voltage for the first stack 300 is at least about 50% lower. In some embodiments, for each stack 300 in a multi-stack system 500, the voltage applied to the stack 300 may be a constant percentage lower than the voltage applied to the subsequent stack 300'. For example, the voltage for the first stack 300 may be about 10% lower than the voltage for the second stack 300', which in turn may be about 10% lower than the voltage for the third stack 300".

In many embodiments, the voltage applied to any given stack 300 in a multi-stack electrodialysis system 500 may be expressed as:

$$V_{cp}^{*2} = \frac{K_C}{K_E}\left(\bar{r}_m + \frac{2h_d}{\sigma k_d} + \frac{2h_c}{\sigma k_c}\right)\frac{1}{\frac{1}{r}\left(1-\left(\frac{1}{1+r}\right)^T\right)}\frac{1}{3.15569e7}$$

In this formula, $V_{cp}^*$ refers to the voltage per cell pair.

$K_C$ is the capital cost of the multi-stack electrodialysis system 500, divided by half of the total surface areas of the anion and cation exchange membranes 315, 320 in the stack. In some embodiments, the surface area may be expressed in $m^2$. In some embodiments, $K_C$ may be between about 25 and about 150 \$/$m^2$, and in one embodiment, $K_C$ is about 50 \$/$m^2$.

$K_E$ is the cost of electricity. In some embodiments, the cost may be expressed as \$/Joule. In various embodiments, $K_E$ may be between about $1.4\times10^{-8}$ and about $5.6\times10^{-8}$ \$/Joule, and in one embodiment, $K_E$ may be about $2.8\times10^{-8}$ \$/Joule.

$\bar{r}_m$ is the average of the anion and cation membrane electrical resistance measured in a solution of 0.5 M NaCl. The resistance may be measured in $\Omega m^2$. In some embodiments, the resistance may be between about $2.00\times10^{-4}$ and about $4.00\times10^{-4}$ $\Omega m^2$, and in one embodiment, the resistance may be about $3.00\times10^{-4}$ $\Omega m^2$. In certain cases, the effective resistance may be higher as the spacer may block a portion of the membrane surface.

$\sigma$ is the spacer shadow factor. Because the spacer reduces the transfer of ions across the membranes, the spacer shadow factor corrects diluate and concentrate resistance accordingly. In some embodiments, the spacer is a polymer mesh, situated between an anion exchange membrane and an adjacent cation exchange membrane. In some embodiments, the spacer is porous and designed to disturb the flow of fluid in a way that facilitates improved velocity gradients, and hence mass transfer gradients, at membrane surfaces. In various embodiments, $\sigma$ may be between about 0.30 and about 0.90. For example, $\sigma$ may be about 0.50.

$h_d$ is the height of a diluate channel. This height may be the distance between the anion 315 and cation 320 exchange membranes between which a diluate 116 flows, and the height may be expressed in meters. In various embodiments, the height may be between about 0.3 and about 2.5 mm (e.g., between about $0.3\times10^{-3}$ m and $2.50\times10^{-3}$ m).

$h_c$ is the height of the concentrate channel. This height may be the distance between the anion 315 and cation 320 exchange membranes between which a concentrate 118 flows, and the height may be expressed in meters.

$k_d$ and $k_c$ are the average diluate conductivity and average concentrate conductivity in the stack. The conductivity may be expressed in Siemens/m. In some embodiments, the conductivity of the diluate may be between about 0.1 and about 30.0 Siemens/m. For example, the conductivity may be about 3.0 or about 4.0 Siemens/m. In various embodiments, the conductivity of the concentrate may be between about 15.0 and about 30.0 Siemens/m.

r is the annual cost of capital, expressed as an interest rate. In many embodiments, the interest rate may be between about 5-15%, such as 7%.

T is the equipment life in years. In many embodiments, T may be between about 10 years and about 20 years.

In some embodiments, the ratio of the voltage applied to one stack to the voltage applied to the immediately subsequent stack is equal to a square root of a ratio of the electrical resistances of the stacks. In various embodiments, the ratio of the voltages falls within about 5% of the square of the ratio of the electrical resistances. In further embodiments, the voltage ratio falls within about 10% of the square of the electrical resistances ratio. The electrical resistance of a stack may be expressed as:

$$R_u \sim \left(2r_m + \frac{h}{\sigma k_c} + \frac{h}{\sigma k_d}\right)$$

wherein each variable has been described, as above.

Cost advantages of some embodiments of the present invention are described in U.S. Provisional Patent Application No. 61/982,973. For example, FIG. 2, on page 9 of the application, depicts an exemplary electrodialysis system 500 that includes ten (10) stacks. The feed provided to the first stack has a conductivity of 0.224 Siemens/m, and voltages are applied to each stack that halve the conductivity of diluate as it flows through that particular stack. FIG. 9, on page 14 of the application, depicts the capital and energy costs of each stack in this system 500. The figure also depicts the total cost of a distillation system to purify a feed with a conductivity of 0.224 Siemens/m. Thus, from this figure, one of ordinary skill in the art can appreciate the reduced costs incurred from a multi-stack electrodialysis system, compared to a distillation system.

In various embodiments, the electrodialysis system 500 may continue recirculating concentrate until the concentrate reaches a salinity of at least 150,000 ppm, or a salinity between about 200 g/L and about 400 g/L. Then, the extraction system may siphon concentrate from the electrodialysis system 500 for disposal, or for use in well completion. In some embodiments, the extraction system bleeds out the concentrate on a continuous basis.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A method of desalinating produced water collected from a fossil fuel extraction operation with an electrodialysis system having a first stack and a second stack, each stack including at least one pair of electrodes between which is disposed at least one cell pair having an anion exchange membrane and a cation exchange membrane, wherein the electrodialysis system is configured to utilize a first voltage applied to the at least one pair of electrodes of the first stack and a second voltage applied to the at least one pair of electrodes of the second stack, and wherein the first stack is configured for conventional operation with a liquid feed having a conductivity below 0.3 Siemens/m, the method comprising:

providing the produced water having a conductivity above 0.3 Siemens/m as the liquid feed to a diluate input of the first stack in the electrodialysis system;

providing a diluate output of the first stack of the electrodialysis system to a diluate input of the second stack;

applying the first voltage, of less than about 0.2V per cell pair, to a first pair of electrodes of the first stack; and applying the second voltage to a second pair of electrodes of the second stack, wherein the first voltage is lower than the second voltage by at least about 10%.

2. A method of claim 1, wherein the produced water has a conductivity above 1.0 Siemens/m.

3. A method of claim 1, wherein the produced water has a conductivity above 3.0 Siemens/m.

4. A method of claim 1, wherein the produced water has a conductivity above 10.0 Siemens/m.

5. The method of claim 1, wherein the first voltage is about 0.15 V per cell pair.

6. The method of claim 1, wherein the first voltage is about 0.10 V per cell pair.

* * * * *